(12) United States Patent
Sellers

(10) Patent No.: US 7,539,329 B2
(45) Date of Patent: May 26, 2009

(54) METHOD AND APPARATUS FOR ENHANCING THE USABILITY OF AN ELECTRONIC DEVICE HAVING AN INTEGRATED FINGERPRINT SENSOR

(75) Inventor: Charles A. Sellers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 10/884,035

(22) Filed: Jul. 1, 2004

(65) Prior Publication Data

US 2006/0008127 A1 Jan. 12, 2006

(51) Int. Cl.
*G06K 9/00* (2006.01)
(52) U.S. Cl. ............... 382/124; 382/125; 382/126; 382/127; 340/5.53; 340/5.83; 356/71; 713/186; 283/68; 283/69
(58) Field of Classification Search ............ 382/124, 382/125, 126, 127; 340/5.53, 5.83; 356/71; 713/186; 283/68, 69
See application file for complete search history.

(56) References Cited

U.S. PATENT DOCUMENTS

| 5,852,670 | A | * | 12/1998 | Setlak et al. | 382/126 |
| 6,028,950 | A | * | 2/2000 | Merjanian | 382/126 |
| 6,912,299 | B1 | * | 6/2005 | Hoshino | 382/124 |
| 6,918,519 | B2 | * | 7/2005 | Vor Keller et al. | 382/124 |
| 2003/0048000 | A1 | * | 3/2003 | Harter et al. | 307/10.6 |

FOREIGN PATENT DOCUMENTS

JP 04-367984 12/1992
JP 2001-266108 A 9/2001

\* cited by examiner

*Primary Examiner*—Vikkram Bali
*Assistant Examiner*—Daniel Zeilberger

(57) ABSTRACT

The usability of an electronic device that includes an integrated fingerprint sensor is enhanced by mounting the fingerprint sensor rotatably and pivotably. The fingerprint sensor is prevented from moving during normal use, but the fingerprint sensor may be repositioned to accommodate a user's preferences.

7 Claims, 4 Drawing Sheets

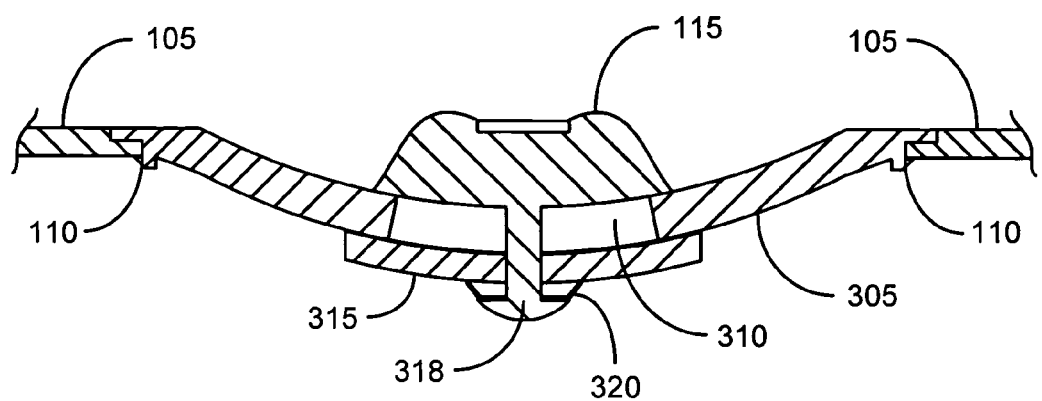
FIG. 3A
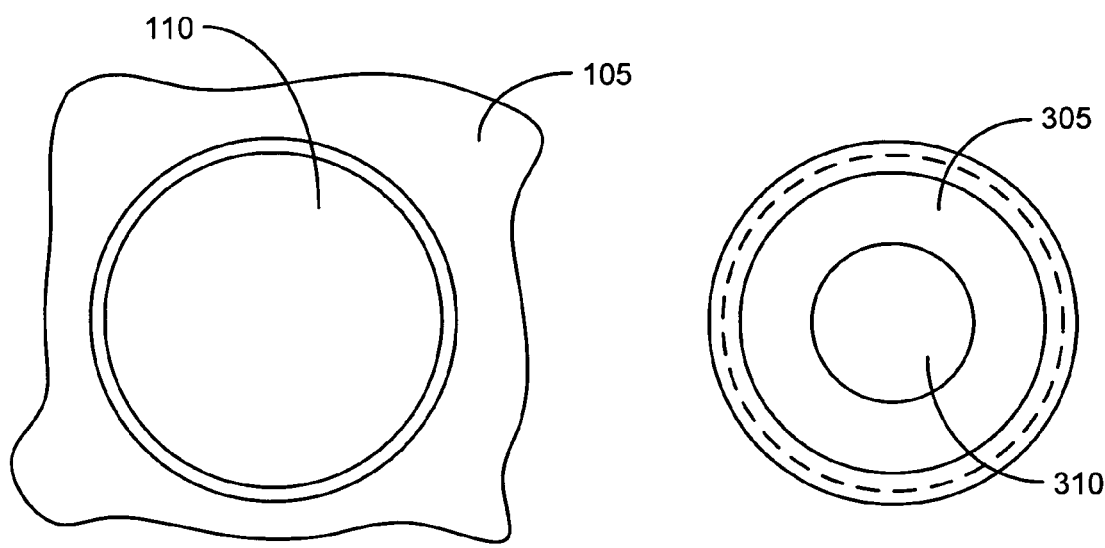
FIG. 3B
FIG. 3C
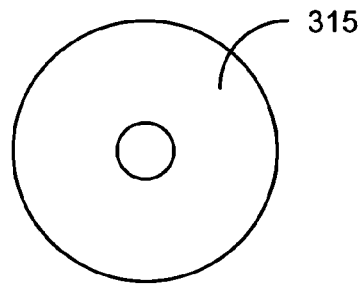
FIG. 3D

METHOD AND APPARATUS FOR ENHANCING THE USABILITY OF AN ELECTRONIC DEVICE HAVING AN INTEGRATED FINGERPRINT SENSOR

FIELD OF THE INVENTION

The present invention relates generally to electronic devices and more specifically to techniques for enhancing the usability of an electronic device that includes an integrated fingerprint sensor for authentication.

BACKGROUND OF THE INVENTION

A variety of electronic devices such as notebook computers and personal digital assistants (PDAs) include an integrated fingerprint sensor for user authentication. Reading and recognizing a user's fingerprint is quick, convenient, and, in many applications, more secure than a typed password. Since a fingerprint sensor must be usable by both right- and left-handed users, the fingerprint sensor is typically located on a portion of the device that represents a compromise (e.g., a centered location). Furthermore, both the location and position of operation of the integrated fingerprint sensor is fixed.

Some users prefer to hold or use a device in a particular way or to use a particular finger or thumb for authentication. The fixed, compromising location of the fingerprint sensor can render such a user's preferences inconvenient, even awkward.

It is thus apparent that there is a need in the art for a method and apparatus for enhancing the usability of an electronic device that includes an integrated fingerprint sensor.

SUMMARY OF THE INVENTION

A method for enhancing the usability of an electronic device that includes a fingerprint sensor is provided. The fingerprint sensor may be mounted rotatably and pivotably within an opening of an enclosure of the electronic device, allowing the fingerprint sensor to be repositioned for convenient operation. The fingerprint sensor may also be prevented from moving during normal operation. An apparatus for carrying out the method is also provided.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 3A-3D are illustrations showing one manner of rotatably and pivotably mounting a fingerprint sensor in accordance with an illustrative embodiment of the invention.

DETAILED DESCRIPTION OF THE INVENTION

The usability of an electronic device that includes an integrated fingerprint sensor may be enhanced by mounting the fingerprint sensor in a manner that allows it to rotate and pivot. This allows a user to adjust the position of the fingerprint sensor for maximum convenience, in accordance with the user's preferences. Allowing the user to adjust the position (angle of rotation and tilt) of the fingerprint sensor to one that is convenient and natural for him or her promotes consistency in the user's use of the fingerprint sensor, thereby improving the accuracy and reliability of fingerprint scans. Since it is generally undesirable for the fingerprint sensor to move during normal use (e.g., swiping a finger across it), the rotatable and pivotable fingerprint sensor may be prevented from moving unless the user desires to adjust its position. This may be accomplished, for example, by mounting the fingerprint sensor with sufficient resistance that additional force beyond that exerted on the fingerprint sensor during normal use is required to reposition it.

Figure 1:
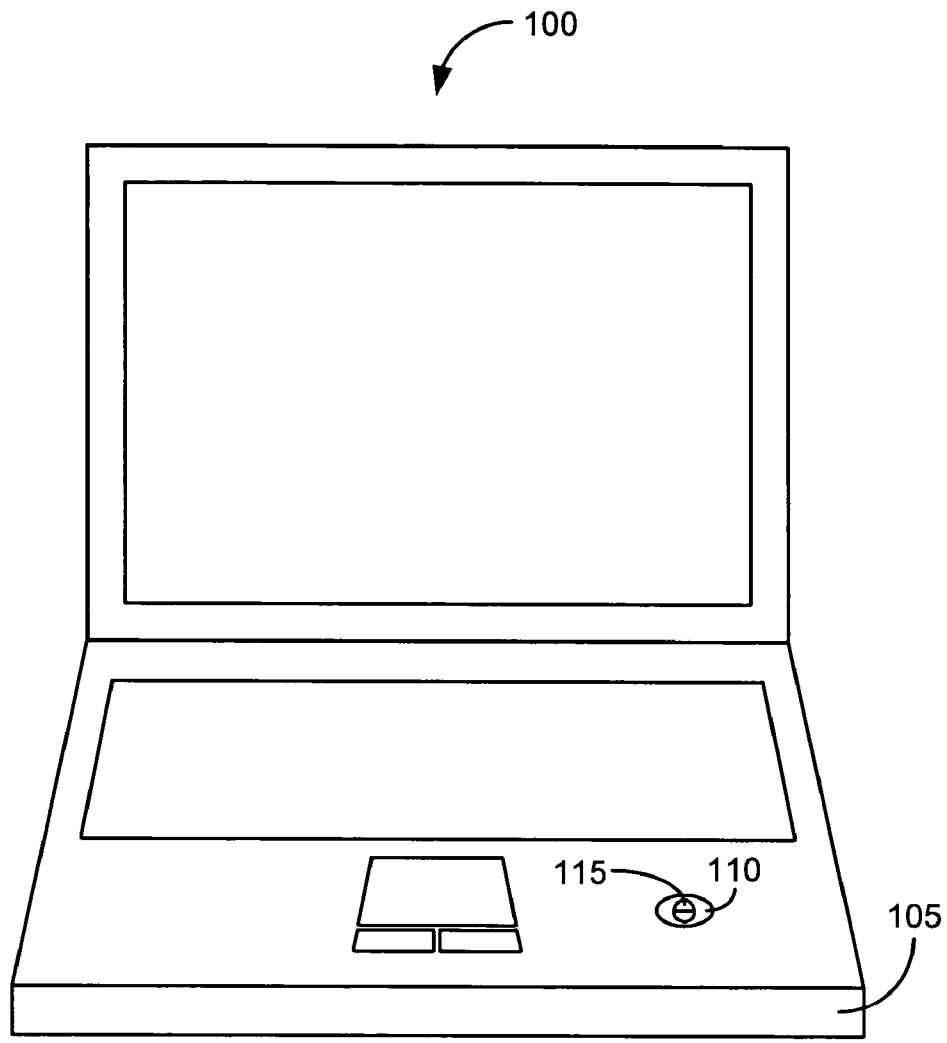
FIG. 1 is an illustration of an electronic device in accordance with an illustrative embodiment of the invention.

FIG. 1 is an illustration of an electronic device 100 in accordance with an illustrative embodiment of the invention. Electronic device 100 is depicted in FIG. 1 as a notebook computer, but electronic device may be any other kind of electronic device that includes an integrated fingerprint sensor. Other examples include but are not limited to a personal digital assistant (PDA), a desktop computer, a digital camera, and a radiotelephone (e.g., a cellular phone). In FIG. 1, electronic device 100 is encased in enclosure 105, which has an opening 110 in which a fingerprint sensor 115 is rotatably and pivotably mounted. Throughout this detailed description, "fingerprint sensor" denotes the actual fingerprint sensor itself, along with any housing or enclosure that contains it.

In the example of FIG. 1, fingerprint sensor 115 is of the thermal type. To use a thermal fingerprint sensor, a user swipes his or her finger or thumb across a narrow slot. A thermal sensor behind the narrow slot detects the ridges defining the fingerprint by sensing temperature differences along the surface of the finger or thumb. In other embodiments, an optical fingerprint sensor (essentially a miniature digital camera) or a silicon-based capacitance fingerprint sensor may be used instead of a thermal sensor. In general, the principles of the invention may be applied to any type of fingerprint sensor.

Figure 2A:
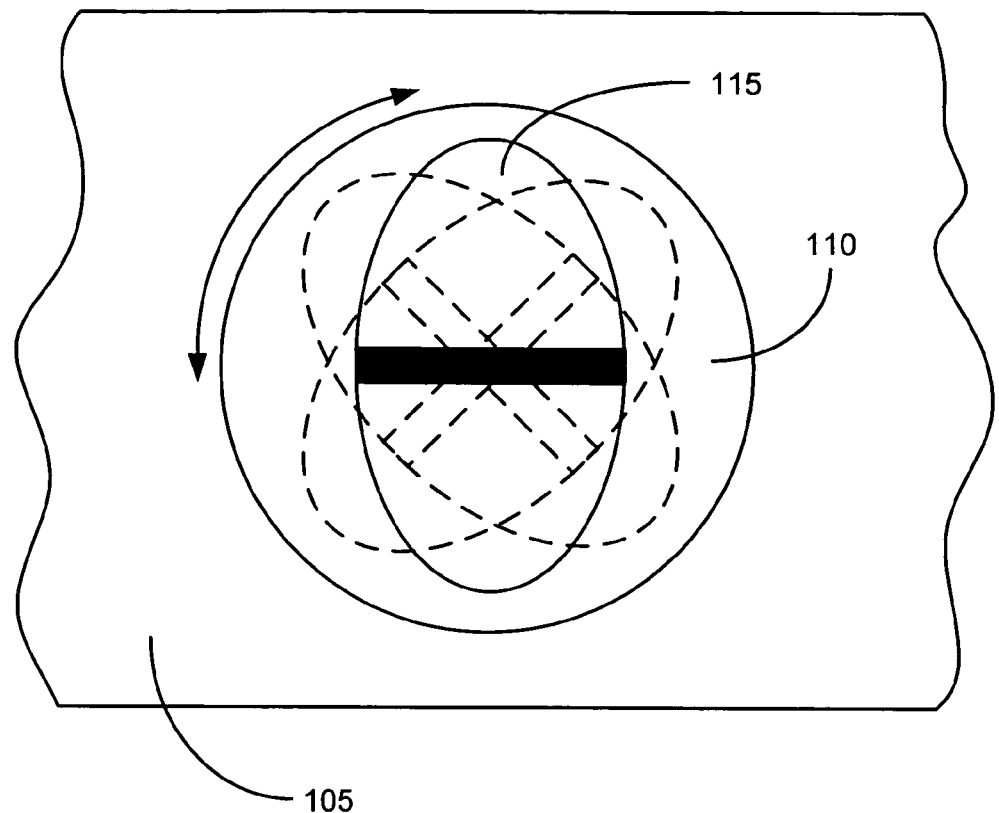
FIG. 2A is an illustration showing a top view of an integrated fingerprint sensor and its rotatability in accordance with an illustrative embodiment of the invention.

FIG. 2A is an illustration showing a top view of fingerprint sensor 115 in accordance with an illustrative embodiment of the invention. FIG. 2A illustrates that fingerprint sensor 115 may rotate in a plane parallel to the surface of enclosure 105. In some embodiments, fingerprint sensor 115 may rotate fully (through 360 degrees).

Figure 2B:
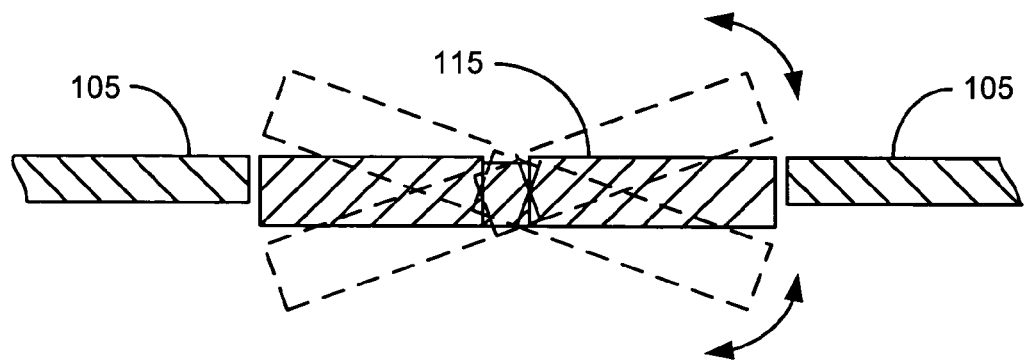
FIG. 2B is an illustration showing a cross-sectional side view of an integrated fingerprint sensor and its pivotability in accordance with an illustrative embodiment of the invention.

FIG. 2B is an illustration showing a cross-sectional side view of fingerprint sensor 115 in accordance with an illustrative embodiment of the invention. FIG. 2B illustrates that fingerprint sensor 115 may tilt (pivot) in a plane that is perpendicular to the surface of enclosure 105. In some embodiments, fingerprint sensor 115 may pivot in any direction.

Rotation, as shown in FIG. 2A, and pivoting, as shown in FIG. 2B, may be combined to allow fingerprint sensor 115 to be repositioned flexibly, thereby accommodating a user's preferences.

FIGS. 3A-3D illustrate one manner of rotatably and pivotably mounting fingerprint sensor 115 in accordance with an illustrative embodiment of the invention. In FIG. 3A, cup-shaped plate 305 is mounted within a circular opening 110. For example, cup-shaped plate 305 may be designed to snap fit into opening 110. Cup-shaped plate 305 has a circular cutout 310 concentric with the center of cup-shaped plate 305 to allow fingerprint sensor 115 to move rotatably and pivotably. Fingerprint sensor 115 rests on top of cup-shaped plate 305 and can slide along it when fingerprint sensor 115 is repositioned. To that end, the underside of fingerprint sensor 115 may have the same curvature as cup-shaped plate 305. End cap 315 rests flush with the underside of cup-shaped plate 305 and slides along the underside of cup-shaped plate 305 when fingerprint sensor 115 is repositioned. Consequently, end cap 315 may have a curvature that matches that of the underside of cup-shaped plate 305. End cap 315 also has a hole concentric with its center. In this embodiment, fingerprint sensor 115 includes an elongated member 318 that extends downward perpendicularly from the center of its underside, passing through circular cutout 310 and the hole in the center of end cap 315. The end of the elongated member that extends through circular cutout 310 and the hold in end cap 315 has a flared out portion (head). In some embodiments, elongated member 318 may be a threaded fastener (e.g., a screw or bolt) that screws into the underside of fingerprint sensor 115. In other embodiments, elongated member 318 may be designed to snap fit through circular cutout 310 and the hole in end cap 315. Spring washer 320 exerts sufficient pressure on end cap 315 to ensure that fingerprint sensor 115 does not move during normal use while allowing fingerprint sensor 115 to be repositioned rotationally, pivotally, or both, when excess force is applied to fingerprint sensor 115.

FIGS. 3B-3D are top views of some of the individual parts shown in FIG. 3A that clarify their shape and other features.

As those skilled in the art will recognize, FIGS. 3A-3D show only one illustrative manner of rotatably and pivotably mounting fingerprint sensor 115. Many other implementations are possible (e.g., a ball-and-socket mounting apparatus), all of which are considered to be within the scope of the invention as claimed.

Figure 4:
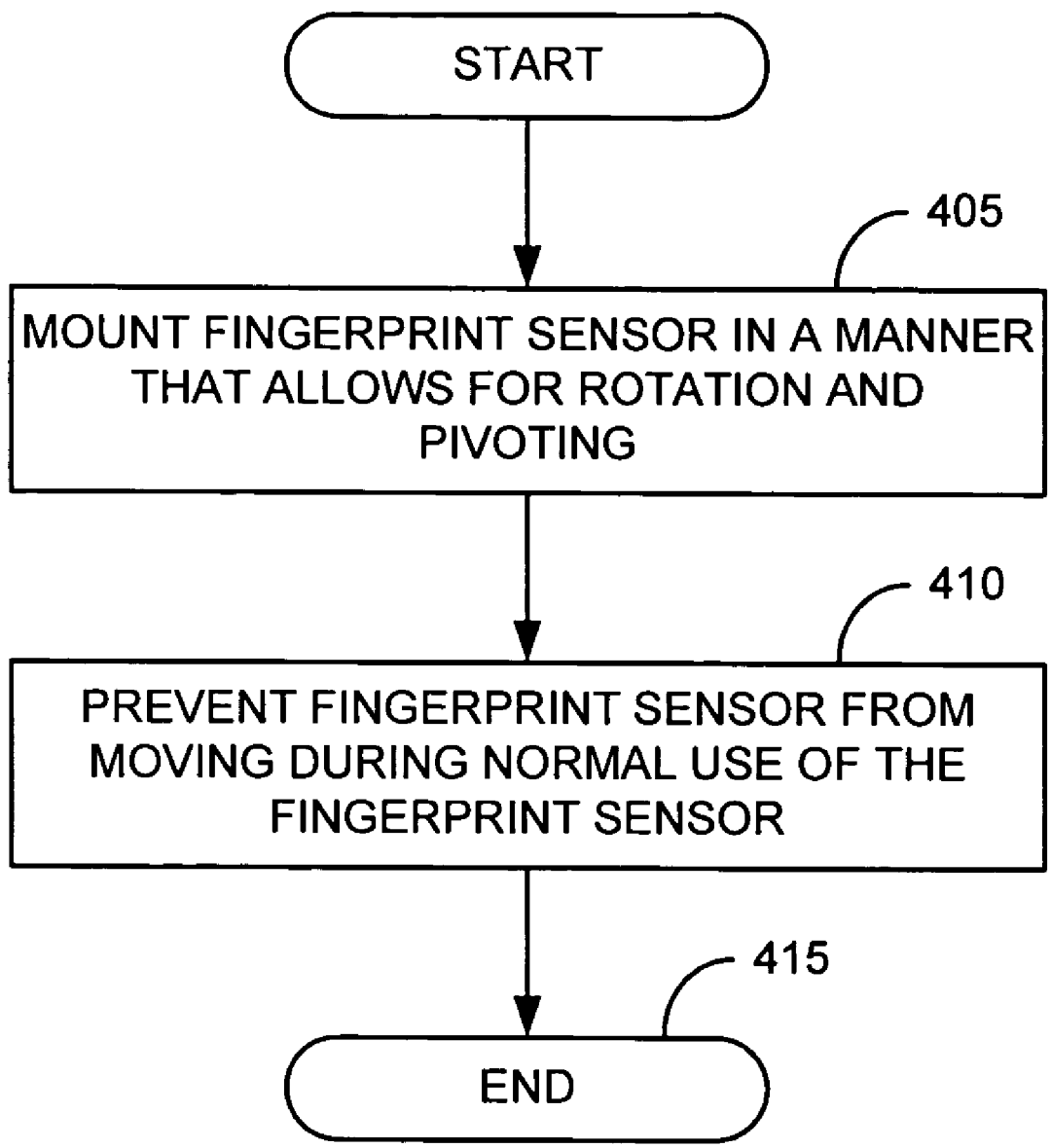
FIG. 4 is a flowchart of a method for enhancing the usability of an electronic device that includes an integrated fingerprint sensor in accordance with an illustrative embodiment of the invention.

FIG. 4 is a flowchart of a method for enhancing the usability of an electronic device 100 that includes an integrated fingerprint sensor 115 in accordance with an illustrative embodiment of the invention. At 405, fingerprint sensor 115 is mounted in a manner that allows for rotation (FIG. 2A) and pivoting (FIG. 2B). At 410, fingerprint sensor 115 is prevented from moving during normal use of fingerprint sensor 115. Step 410 may be accomplished in a variety of ways, one of which is shown in FIGS. 3A-3D. In general, fingerprint sensor 115 may be mounted with sufficient resistance that additional force beyond that exerted on fingerprint sensor 115 during normal use is required to reposition it. At 415, the process terminates.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic device, comprising:
an enclosure having a circular opening;
a cup-shaped plate mounted within the circular opening, the cup-shaped plate having a circular cutout that is concentric with its center;
a fingerprint sensor seated atop the cup-shaped plate, the fingerprint sensor having a curved underside that mates with a top surface of the cup-shaped plate, the fingerprint sensor having an elongated member that extends perpendicularly downward from the center of the curved underside of the fingerprint sensor, the elongated member extending through the circular cutout, the elongated member having a flared out portion at an end opposite the curved underside of the fingerprint sensor;
an end cap flush with an underside of the cup-shaped plate, a top surface of the end cap having a curvature that mates with the underside of the cup-shaped plate, the end cap having a hole concentric with its center, the elongated member extending through the hole; and
a spring washer inserted between the flared out portion and an underside of the end cap, the spring washer exerting sufficient tension to prevent the fingerprint sensor from moving during normal use of the fingerprint sensor while permitting rotation and pivoting of the fingerprint sensor, when excess force is applied to the fingerprint sensor.

2. The electronic device of claim 1, wherein the elongated member comprises a threaded fastener screwed into the curved underside of the fingerprint sensor.

3. The electronic device of claim 1, wherein the fingerprint sensor comprises one of a thermal sensor, an optical sensor, and a silicon-based capacitance sensor.

4. The electronic device of claim 1, wherein the electronic device comprises one of a notebook computer, a desktop computer, a PDA, a digital camera, and a radiotelephone.

5. An electronic device, comprising:
an enclosure having an opening;
means for reading a fingerprint;
means for rotatably and pivotably mounting, within the opening, the means for reading a fingerprint so the means for reading a fingerprint rotates in a plane parallel to a surface of the enclosure and pivots in a plane perpendicular to the surface of the enclosure, wherein the means for rotatably and pivotably mounting, within the opening, the means for reading a fingerprint comprises:
a cup-shaped plate mounted within the circular opening, the cup-shaped plate having a circular cutout that is concentric with its center, the means for reading a fingerprint resting atop the cup-shaped plate, the means for reading a fingerprint having a curved underside that mates with a top surface of the cup-shaped plate, the means for reading a fingerprint having an elongated member that extends perpendicularly downward from the center of the curved underside of the means for reading a fingerprint, the elongated member extending through the circular cutout, the elongated member having a flared out portion at an end opposite the curved underside of the means for reading a fingerprint;
an end cap flush with an underside of the cup-shaped plate, a top surface of the end cap having a curvature that mates with the underside of the cup-shaped plate, the end cap having a hole concentric with its center, the elongated member extending through the hole; and
a spring washer inserted between the flared out portion and an underside of the end cap, the spring washer exerting sufficient tension to prevent the means for reading a fingerprint from moving during normal use of the means for reading a fingerprint while permitting rotation and pivoting of the means for reading a fingerprint, when excess force is applied to the means for reading a fingerprint.

6. The electronic device of claim 5, wherein the means for reading a fingerprint comprises one of a thermal sensor, an optical sensor, and a silicon-based capacitance sensor.

7. The electronic device of claim 5, wherein the electronic device comprises one of a notebook computer, a desktop computer, a PDA, a digital camera, and a radiotelephone.

* * * * *

UNITED STATES PATENT AND TRADEMARK OFFICE
CERTIFICATE OF CORRECTION

| | | |
|---|---|---|
| PATENT NO. | : 7,539,329 B2 | Page 1 of 1 |
| APPLICATION NO. | : 10/884035 | |
| DATED | : May 26, 2009 | |
| INVENTOR(S) | : Charles A. Sellers | |

It is certified that error appears in the above-identified patent and that said Letters Patent is hereby corrected as shown below:

In column 4, line 44, in Claim 5, delete "fingerprint:" and insert -- fingerprint; --, therefor.

Signed and Sealed this

Eighth Day of September, 2009

David J. Kappos
*Director of the United States Patent and Trademark Office*